(12) United States Patent
Fan

(10) Patent No.: US 9,999,296 B1
(45) Date of Patent: Jun. 19, 2018

(54) LAPTOP PC STAND

(71) Applicant: Eagle Fan, Hsinchu (TW)

(72) Inventor: Eagle Fan, Hsinchu (TW)

( * ) Notice: Subject to any disclaimer, the term of this patent is extended or adjusted under 35 U.S.C. 154(b) by 0 days. days.

(21) Appl. No.: 15/659,087

(22) Filed: Jul. 25, 2017

(51) Int. Cl.
*A47B 23/04* (2006.01)
*F16M 11/20* (2006.01)

(52) U.S. Cl.
CPC ......... *A47B 23/04* (2013.01); *F16M 11/2021* (2013.01); *A47B 23/043* (2013.01); *A47B 2023/049* (2013.01)

(58) Field of Classification Search
USPC ....... 248/448, 449, 451, 453, 454, 455, 456, 248/457, 458, 460, 461, 463, 464, 150, 248/149, 154; 361/679.02, 679.026, 361/679.55, FOR. 103, FOR. 106
See application file for complete search history.

(56) References Cited

U.S. PATENT DOCUMENTS

| | | | | |
|---|---|---|---|---|
| 4,436,271 A * | 3/1984 | Manso | .................... | A47B 19/00 248/452 |
| 4,466,601 A * | 8/1984 | Raines | .................. | B23B 47/287 248/455 |
| 4,470,571 A * | 9/1984 | Hartman | ................ | A47B 19/10 248/452 |
| 5,580,024 A * | 12/1996 | Briee | .................... | A47B 23/043 248/444 |
| 5,639,053 A * | 6/1997 | Dmitriev | .............. | A47B 23/043 248/453 |
| 5,720,465 A * | 2/1998 | Peltzer | .................. | A47B 23/007 248/453 |
| 5,797,578 A * | 8/1998 | Graffeo | ................ | A47B 23/043 248/453 |
| 7,213,794 B1 * | 5/2007 | Jefferies | ................ | A47B 23/044 248/447 |
| 8,770,536 B2 * | 7/2014 | Hu | ...................... | G01R 31/2808 248/447 |
| 2003/0029985 A1 * | 2/2003 | Zeller | .................. | A47B 23/043 248/461 |
| 2008/0191113 A1 * | 8/2008 | Edgmon | ................ | A47B 97/08 248/451 |
| 2010/0038514 A1 * | 2/2010 | Yu | ........................ | A47B 23/044 248/449 |
| 2014/0116299 A1 * | 5/2014 | Salehi | .................... | A47B 41/06 108/32 |
| 2017/0150812 A1 * | 6/2017 | Tomomatsu | .......... | G06F 1/1679 |

* cited by examiner

*Primary Examiner* — Alfred Wujciak
(74) *Attorney, Agent, or Firm* — Muncy, Geissler, Olds & Lowe, P.C.

(57) ABSTRACT

A laptop PC stand is disclosed, comprising: a carrier unit, an extension unit and a rotation support unit; the carrier unit and the extension unit being arranged side by side to form a platform carrying a laptop PC, the carrier unit having a placement surface with a partial area concave and forming a housing space, and a first side and a second side; the extension unit being adjacent to the second side, being disposed with a plurality of tracks extending into the carrier unit, and disposed with at least a stop block, the stop block standing on the extension unit when flipped; the rotation support unit coupled to the first side, and after rotation, being located inside the housing space or standing on the first side; the rotation support unit having a first clamping element and a second clamping element, able to move towards the same or opposite direction.

4 Claims, 6 Drawing Sheets

LAPTOP PC STAND

TECHNICAL FIELD

The technical field generally relates to a laptop personal computer (PC) stand, and in particular, to a laptop PC stand of a small size when folded for portability, and providing various support styles when expanded for fixing a laptop PC to provide convenience.

BACKGROUND

As the technology progresses, modern electronic and multimedia related products, such as, PC, laptop PC, tablets, mobile devices, and so on, become ubiquitous. Portable electronic devices, such as laptop PC, are widely used by users for numerous office-related works, including document processing, presentation, and video playback.

Although the laptop PC is adjustable for various tasks, the users often prefer to use an auxiliary stand to add more convenience when viewing, inputting on the keyboard, having more room for heat dissipation between the laptop and the surface of placement. In general, the stand must be small in size, and easy for storage and portability. How to address the needs becomes an imperative issue for the laptop PC stand designers.

SUMMARY

The primary object of the present invention is to provide a laptop PC stand. The laptop PC stand becomes a small flat object when folded for portability, and can provide various support styles tot h laptop PC to meet different needs for users when performing various tasks on the laptop PC.

To achieve the aforementioned object, the present invention provides a laptop PC stand, comprising: a carrier unit, an extension unit and a rotation support unit; the carrier unit and the extension unit being able to be arranged side by side to form a platform carrying a laptop PC, the carrier unit having a placement surface, and a first side and a second side oppositely disposed, wherein, the placement surface having a partial area concave and forming a housing space; the extension unit being adjacent to the second side, the extension unit being disposed with a plurality of tracks extending into the carrier unit; the extension unit being disposed with at least a stop block, the stop block standing on the extension unit when flipped up; the rotation support unit being coupled to the first side, and the rotation support unit, after rotation, being located inside the housing space or standing on the first side; the rotation support unit having a first clamping element and a second clamping element, disposed oppositely, the first clamping element and the second clamping element able to move towards the same or opposite direction to clamping on two sides of a laptop PC screen.

In an exemplary embodiment, the extension unit can move away from the carrier unit so as to expand an area covered by the carrier unit and the extension unit to provide placement for larger size laptop PC. Also, the first clamping element and the second clamping element disposed on the rotation support unit can also adjust clamping width to accommodate laptop PCs of various sizes.

In an exemplary embodiment, the extension unit forms at least a housing space, and the housing space is disposed with a sliding axis, the stop block is disposed on the sliding axis so that the stop block can slide laterally along the sliding axis and stand on the extension unit; moreover, after flipping, the stop block can be housed inside the housing space.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1:
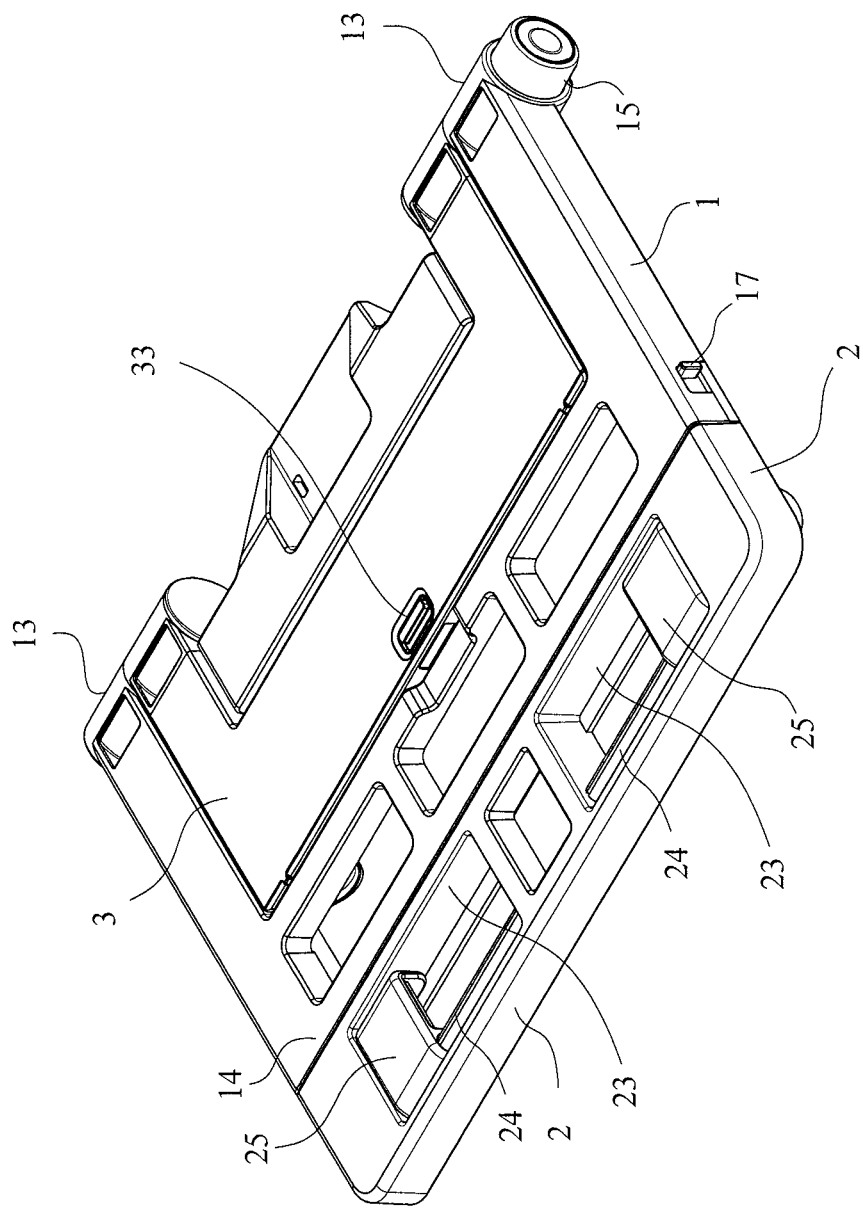
FIG. 1 shows a schematic view of the present invention when folded in accordance with an exemplary embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
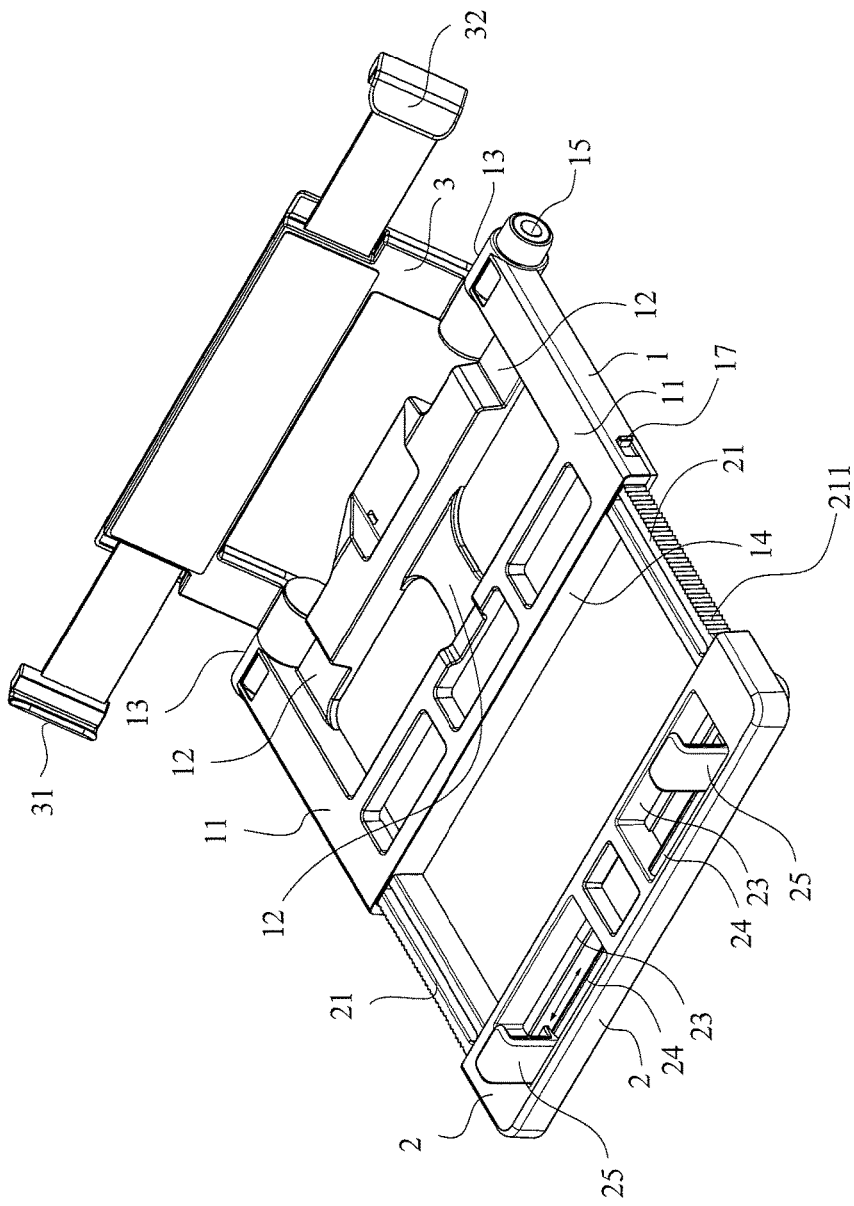
FIG. 2 shows a schematic view of the present invention when expanded for use in accordance with an exemplary embodiment.

FIG. 1 and FIG. 2 show schematic views of the present invention in a folded state and an expanded state respectively. The laptop PC stand of the present invention comprises: a carrier unit 1, an extension unit 2, and a rotation support unit 3.

Figure 3:
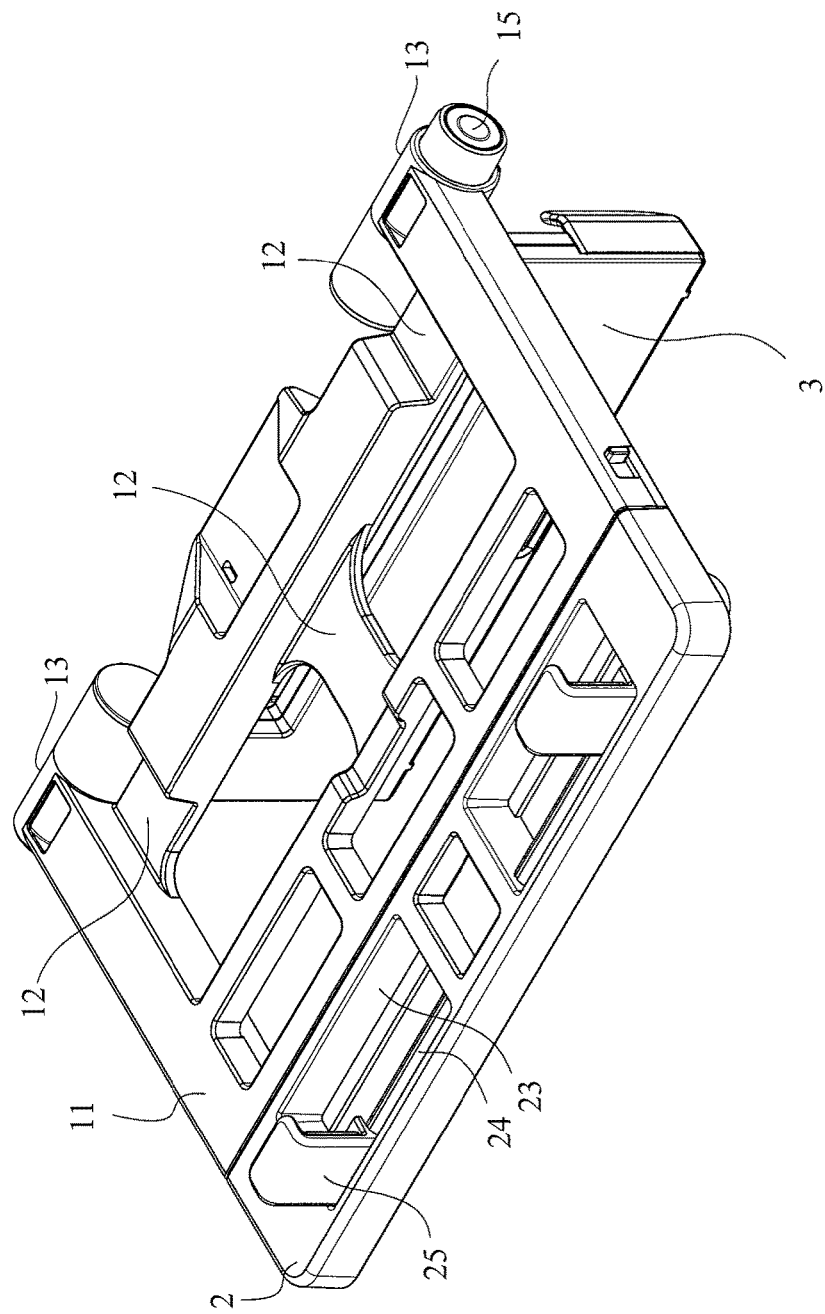
FIG. 3 shows a schematic view of the present invention from a different angle when expanded for use in accordance with an exemplary embodiment.

The carrier unit 1 and the extension unit 2 form a placement platform for a laptop PC. The carrier unit 1 has a shape similar to a rectangle. To save material and cost, the carrier unit 1 of the present embodiment is designed as a rectangular frame. The carrier unit 1 has a top having a placement surface 11, on which the laptop PC is placed. A partial area of the placement surface 11 is concave to form a housing space 12. The housing space 12 has a shape matching the folded shape of the rotation support unit 3 to house the rotation support unit 3 (as shown in FIG. 1). The carrier unit 1 has a first side 13 and a second side 14, located opposite to each other. The two sides are the length of the rectangular frame, wherein the rotation support unit 3 is coupled to the first side 13, through a knob 15. When the knob 15 is loosened, the rotation support unit 3 can be rotated to adjust position, or even flipped to the bottom of the carrier unit 1 (as shown in FIG. 3). The knob 13 is tightened to fix the relative position of the rotation support unit and the carrier unit 1.

Figure 4:
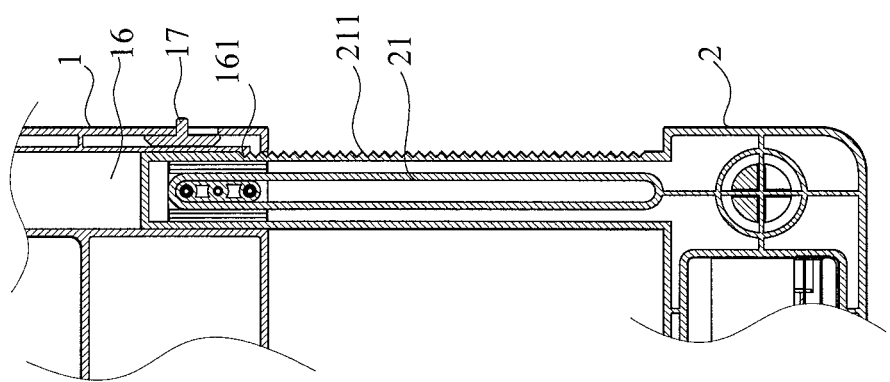
FIG. 4 shows a schematic view of fixing the tracks of the extension unit to the carrier unit of the present invention in accordance with an exemplary embodiment.

The extension unit 2 is adjacent to the second side 14 of the carrier unit 1. The extension unit 2 is disposed with a plurality of tracks extending into the carrier unit 1. The present invention includes two track sets 21, with which the extension unit 2 can move in a direction away from the carrier unit 1 to expand the area covered by the carrier unit 1 and the extension unit 2 in order to accommodate larger size laptop PCs. As shown in FIG. 4, to fix the location after movement, the tracks 21 are located inside guiding trench 16 of the carrier unit 1, wherein the outward vertical surface of the tracks 21 is disposed with a teeth surface 211, and the surface of the guiding trench 16 facing the teeth surface 21 is disposed with a resilient teeth part 161 and a flip element 17. The resilient teeth part 161 is temporarily engaged to the teeth surface 211. When an external force pulling the extension unit 2 is greater than the resilient force, the extension unit 2 is pulled outward. The exposed flip element 17 can be moved for a short distance. When the flip element 17 is flipped towards the resilient teeth part 161, the resilient teeth part 161 loses the resilient movement capability. As such, the resilient teeth part 161 is against the teeth surface 211 to fix the position after adjustment.

Moreover, the extension unit 2 forms at least a housing space 23 opening upwards. The housing space 23 is disposed with a sliding axis. The stop block 25v is disposed on the sliding axis 24, is able to slid laterally along the sliding axis 24 and stands on the extension unit 2 (as shown in FIG. 2), or housed inside the housing space 23 after slipping as shown in FIG. 1.

He rotation support unit 3 is coupled to the first side 13 of the carrier unit 1. After turning over, the rotation support unit 3 can stand to protrude above the placement surface 11, or housed inside the housing space 12. The rotation support unit 3 is disposed with a first clamping element 31 and a second clamping element 32, disposed oppositely to each other. The first clamping element 31 and the clamping element 32 can move in the same or opposite direction to clamp on two sides of the screen of the laptop PC. The known technology provides various mechanisms for the realization of the first clamping element 31 and the second clamping element 32 to move away from or towards each other, and the details will not be described here. The rotation support unit 3 is disposed with a release key 33 on the back. When the release key 33 is flipped, the clamping of the first clamping element 31 and the second clamping element 32 is released so as the positions of the first clamping element 31 and the second clamping element 32 can be adjusted.

Figure 5:
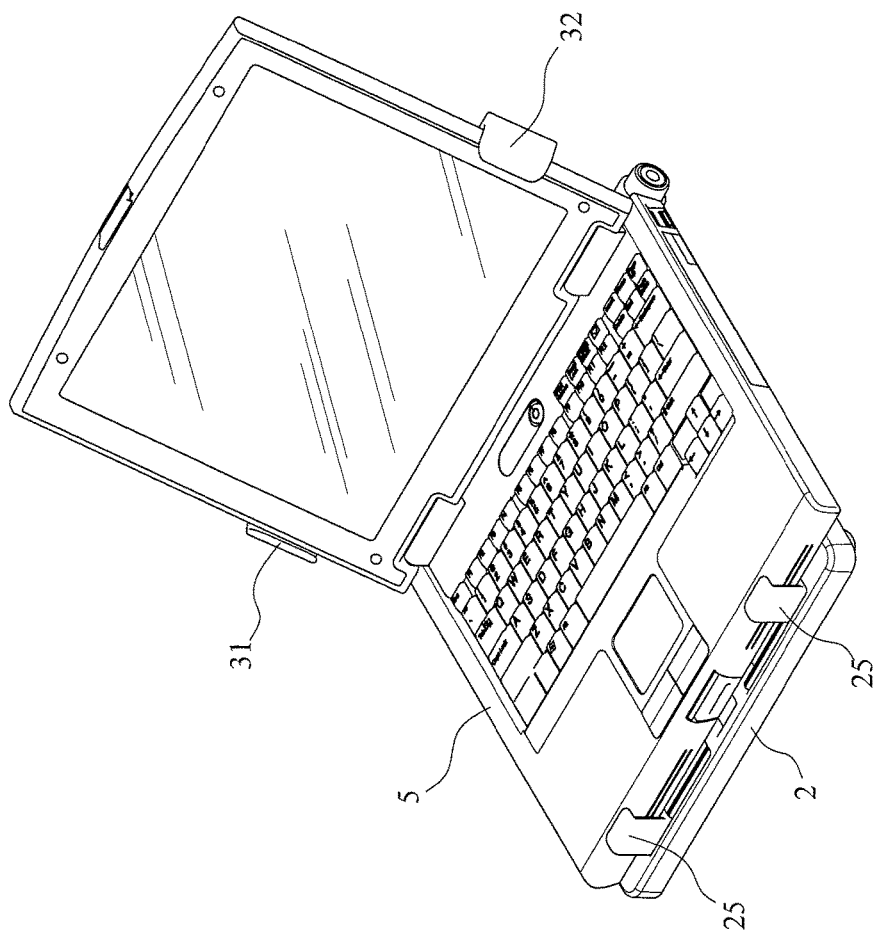
FIG. 5 shows a schematic view of the present invention clamping a laptop PC in accordance with an exemplary embodiment.
Figure 6:
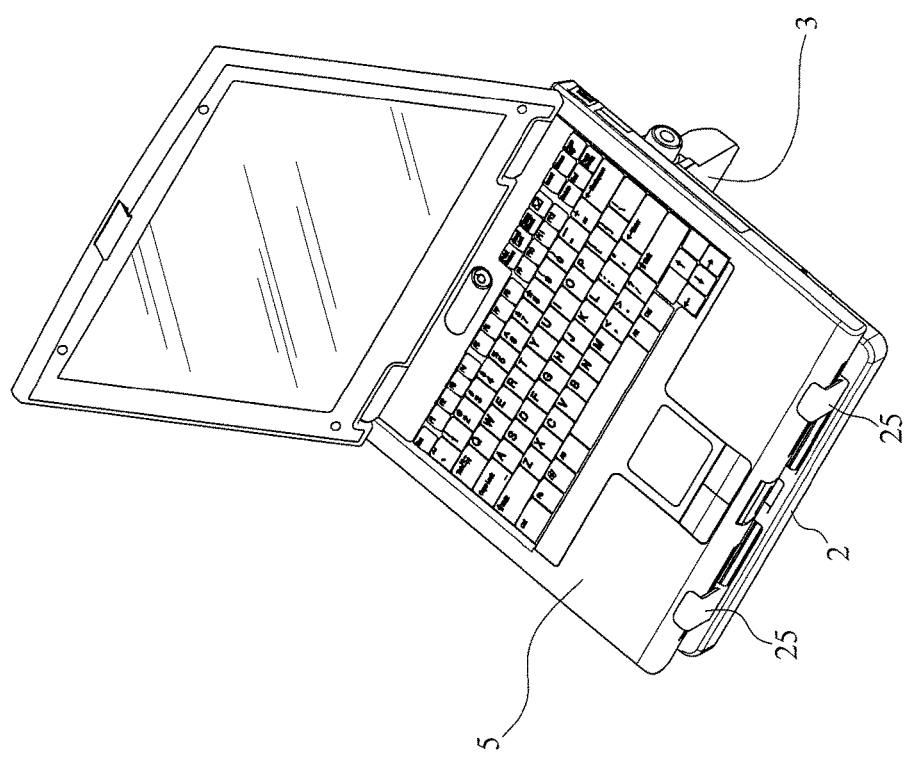
FIG. 6 shows a schematic view of the present invention placed on a desk for laptop PC in accordance with an exemplary embodiment.

FIG. 5 and FIG. 6 show schematic views of the present invention in different usages. For example, the carrier unit 1 and the extension unit 2 can be placed on the desk with a leaning angle (as shown in FIG. 6), and the rotation support unit 3 is adjusted to support the leaning angle of the present invention. Also, by using the plurality of stop blocks 25, the first clamping element 31 and the second clamping element 32 to fix a laptop PC 5, the present invention can be used for installation to other devices to provide different usage styles.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A laptop personal computer (PC) stand, comprising:
    a carrier unit, having a placement surface, and the placement surface having a partial area concave and forming a housing space, the carrier unit having a first side and a second side, located opposite to each other;
    an extension unit, adjacent to the second side of the carrier unit, the extension unit being disposed with a plurality of tracks extending into the carrier unit for adjusting distance between the carrier unit and the extension unit, the extension unit being disposed with at least a stop block, the stop block standing on the extension unit when flipped up; and
    a rotation support unit, coupled to the first side of the carrier unit, and the rotation support unit, after rotation, being located inside the housing space or in a stand position adjacent to the first side; the rotation support unit having a first clamping element and a second clamping element, disposed opposite to each other, the first clamping element and the second clamping element able to move towards the same or opposite direction, wherein the first and second clamping elements are adapted to retain a laptop computer therein.

2. The laptop PC stand as claimed in claim 1, wherein knob is disposed at coupling location between the carrier unit and the rotation support unit, and the position of the rotation support unit can be adjusted when the knob is loosened.

3. The laptop PC stand as claimed in claim 1, wherein the tracks are inserted inside guiding trenches of the carrier unit, and side walls of the guiding trenches are disposed with a teeth surface, and an inner surface of the guiding trench facing the teeth surface is disposed with a resilient teeth part and a movable flip element; when the flip element is moved to near the resilient teeth part, the resilient teeth part is engaged to the teeth surface so that the tracks cannot be moved.

4. The laptop PC stand as claimed in claim 1, wherein the extension unit forms at least a housing space with opening upwards, the housing space is disposed with a sliding axis, the stop block is disposed at the sliding axis, is able to slide along the sliding axis and stands on the extension unit, or the stop block can be flipped to be housed inside the housing space.

\* \* \* \* \*